US009601755B2

(12) United States Patent
Reichman et al.

(10) Patent No.: US 9,601,755 B2
(45) Date of Patent: *Mar. 21, 2017

(54) COMPOSITE CATHODE MATERIALS HAVING IMPROVED CYCLE LIFE

(71) Applicant: Ovonic Battery Company, Inc., Rochester Hills, MI (US)

(72) Inventors: Benjamin Reichman, West Bloomfield, MI (US); William Mays, Commerce, MI (US); Diana Wong, Sterling Heights, MI (US)

(73) Assignee: Ovonic Battery Company, Inc., Rochester Hills, MI (US)

(*) Notice: Subject to any disclaimer, the term of this patent is extended or adjusted under 35 U.S.C. 154(b) by 387 days.

This patent is subject to a terminal disclaimer.

(21) Appl. No.: 13/829,884

(22) Filed: Mar. 14, 2013

(65) Prior Publication Data

US 2014/0264158 A1    Sep. 18, 2014

(51) Int. Cl.
*H01M 4/36* (2006.01)
*H01M 4/131* (2010.01)
(Continued)

(52) U.S. Cl.
CPC .......... *H01M 4/364* (2013.01); *H01M 4/131* (2013.01); *H01M 4/505* (2013.01); *H01M 4/525* (2013.01);
(Continued)

(58) Field of Classification Search
CPC .......... H01M 4/525; H01M 4/48; H01M 4/50; H01M 4/58; H01M 4/505; H01M 4/485; H01M 10/0525; C01D 1/02; C01D 15/02
See application file for complete search history.

(56) References Cited

U.S. PATENT DOCUMENTS 5,478,674 A * 12/1995 Miyasaka ............. H01M 4/485
  429/223
6,337,132 B1 * 1/2002 Kajiyama ............. C01G 51/42
  264/618
(Continued)

FOREIGN PATENT DOCUMENTS

KR    20080048442 A    6/2008
KR    20120004141 A    1/2012
(Continued)

OTHER PUBLICATIONS

"High Voltage study of Li-Excess Material as a cathode Material for Li-Ion Batteries" The Electrochemical Society, Interface, Winter 2008, p. 70-71.*

(Continued)

*Primary Examiner* — Peter F Godenschwager
*Assistant Examiner* — Andrew J Oyer
(74) *Attorney, Agent, or Firm* — Dinsmore & Shohl LLP; Weston Gould

(57) ABSTRACT

Lithiated composite materials and methods of manufacture are provided that are capable of imparting excellent capacity and greatly improved cycle life in lithium-ion secondary cells. By supplementing a high nickel content lithium storage material with a transition metal oxide lithium storage material or a dopant at relatively low levels, the capacity of the high nickel content lithium storage materials is maintained while cycle life is dramatically improved. These characteristics are promoted by methods of producing the materials that intermix unlithiated precursor materials with a lithium source and sintering the materials together in a single sintering reaction. The resulting lithiated composite materials provide for the first time both high capacity and excellent cycle life to predominantly high nickel content electrodes.

14 Claims, 8 Drawing Sheets

Capacity and cycling performance of $Ni_{92}Co_8$ composite cathode materials

(51) Int. Cl.
    *H01M 4/505*      (2010.01)
    *H01M 10/0525*    (2010.01)
    *H01M 4/525*      (2010.01)
(52) U.S. Cl.
    CPC ........ *H01M 10/0525* (2013.01); *Y02E 60/122* (2013.01)

(56) References Cited

U.S. PATENT DOCUMENTS

| | | |
|---|---|---|
| 8,012,624 B2 | 9/2011 | Jiang et al. |
| 2005/0112054 A1 | 5/2005 | Eberman et al. |
| 2009/0087744 A1* | 4/2009 | Jiang .................... H01M 4/525 429/218.1 |
| 2010/0081055 A1* | 4/2010 | Konishi et al. ............... 429/223 |
| 2010/0310934 A1* | 12/2010 | Yang et al. ................... 429/221 |
| 2013/0122370 A1* | 5/2013 | Rho et al. ..................... 429/220 |

FOREIGN PATENT DOCUMENTS

| | | |
|---|---|---|
| KR | 101138637 B1 | 4/2012 |
| WO | WO-2009045766 A1 | 4/2009 |

OTHER PUBLICATIONS

International Search Report and Written Opinion issued Jun. 3, 2014 for co-pending application PCT/US2013/031996.

\* cited by examiner

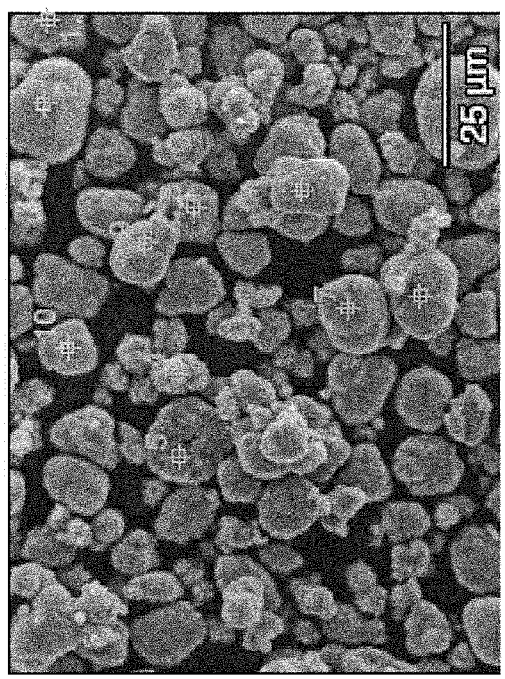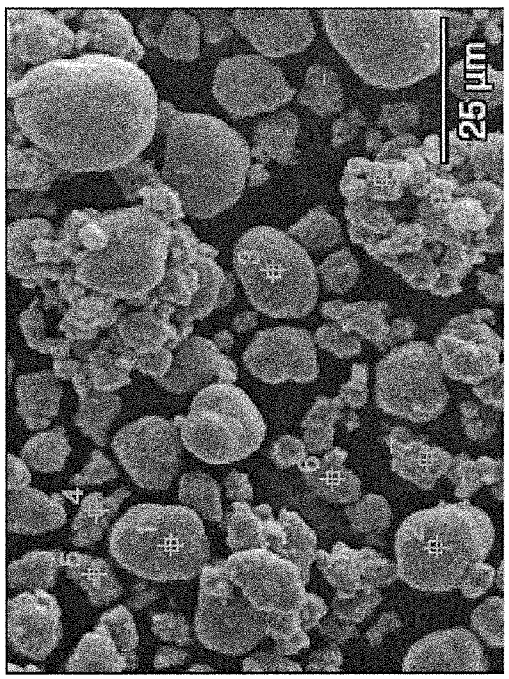
FIG. 2A
FIG. 2B

COMPOSITE CATHODE MATERIALS HAVING IMPROVED CYCLE LIFE

FIELD OF THE INVENTION

This invention relates to composite materials and methods for their fabrication. In particular, the invention relates to composite lithium storage materials that are capable of absorbing and desorbing lithium. In particular, the invention relates to a composite of a high nickel content material and a transition metal oxide or sulfide, the combination of which provides a lithium storage material with high capacity over an extended cycle life.

BACKGROUND OF THE INVENTION

Demand for lithium-ion secondary batteries continues to grow with the dramatic increase in use of portable devices such as cellular telephones, tablet computers, and cameras that require high performance and reliability in their power sources. Along with this boost in the number of portable devices, the development of a power system for automobiles that does not rely solely on fossil fuels is becomingly increasingly important to producing an energy independent nation.

A generalized lithium battery includes an anode and a cathode that are disposed in a volume of a nonaqueous electrolyte material typically including one or more lithium salts and a solvent such as an organic carbonate material. In most instances, the anode and cathode have a body of separator material interposed therebetween. During the charging of the battery, lithium ions travel from the cathode to the anode and are intercalated therein. During discharge of the battery, the process reverses.

The high energy density of lithium ion secondary batteries makes these an attractive source of power for many markets. Small-size lithium ion secondary batteries historically use $LiCoO_2$ as a cathode material along with a carbon based anode. Driving this is the superiority of $LiCoO_2$ in terms of stable charge-discharge characteristics and high electronic conductivity. Unfortunately, these materials also suffer from high expense, biological toxicity, and reduced efficiency due to cobalt deposits.

Nickel containing mixed oxide materials offer a solution to the disadvantages of $LiCoO_2$. These materials offer high capacities, often with a specific capacity of 200 mAh/g or greater. Among promising materials for cathodes, NiO2 or compositions where some of the nickel is replaced with cobalt, show excellent capacities, but suffer from suboptimal cycle life as a result of their high oxidation power and oxygen release. For example, after only 5 and 10 cycles the capacity of $NiO_2$ or $Ni_{92}Co_8$ drops from >200 mAh/g to <160 mAh/g.

Other materials have recently been combined with nickel hydroxides in an attempt to create a material with acceptable cycling characteristics. For example, U.S. Pat. No. 8,012,624 combines a mixed metal hydroxide with $Ni(OH)_2$. While these materials were able to resist capacity losses in excess of 14% at 60 cycles, their specific capacity was dismal in comparison to $Ni(OH)_2$ alone suggesting that this combination of materials may not provide the necessary characteristics for high energy demands.

While the desire for superior electrode materials for lithium ion batteries continues to grow, the materials necessary to satisfy the high demands of current and future market devices are still lacking. Thus, there is a need for new materials and methods for their production for use as a cathode in lithium-ion cells.

Disclosed are composite materials suitable for use as a cathode in a lithium ion cell. The materials of the present invention are relatively low in cost, and when incorporated into a battery system, manifest large charge storage capacities together with significantly improved cycle life. Methods of producing several embodiments of these materials allow formation of a specific molecular structure that is unexpectedly resistant to capacity losses during cycling. These and other advantages of the present invention will be apparent from the drawings, discussion, and description that follow.

SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

Methods of making a high capacity, long cycle life electrode for a rechargeable lithium ion electrochemical cell that address the long felt need for a high capacity, long cycle life battery. Methods include: providing a non-lithiated high nickel content lithium storage material that is characterized by greater than 63 weight percent nickel; providing a non-lithiated transition metal oxide lithium storage material characterized by less than 55 weight percent nickel; mixing the lithium storage materials with a lithium source to form a lithiated composite material, wherein the high nickel content lithium storage material is present as a predominant by weight relative to the transition metal oxide lithium storage material; and then sintering the lithiated composite material. The resulting lithiated composite materials have both unexpected high capacity and longer cycle life than that of the high nickel content lithium storage material alone. In some instances, the performance characteristics of the lithiated composite materials include the ability to maintain a capacity in excess of 180 mAh/g at 40 cycles in some embodiments and, optionally a capacity in excess of 170 mAh/g at 20 cycles in other embodiments.

The step of mixing the non-lithiated high nickel content lithium storage material and the non-lithiated transition metal oxide lithium storage material along with the lithium source is optionally achieved by ball mill mixing methods. Ball milling results in an unexpected increase in both capacity and cycle life of the resulting materials relative to other mixing techniques.

In particular instances, the methods employ the transition metal oxide lithium storage material at 20 weight percent or less, optionally 1 to 20 weight percent, relative to the high nickel content lithium storage material. Particular embodiments employ a high nickel content lithium storage material with a formula that is $Ni_aCo_b$ where a+b=100, where in some instances a is optionally from 80 to 100 and b is optionally from 0 to 20. In some highly specific embodiments, the high nickel content lithium storage material includes $NiO_2$, $Ni_{92}Co_8O_2$, or combinations thereof. The method optionally uses a high nickel content lithium storage material that includes Mn at an atomic percentage of 10% or less.

The transition metal oxide lithium storage material used in particular instances of the methods has formula $Ni_xCo_yMn_z$ where x+y+z=1. Optionally, the $Ni_xCo_yMn_z$ has the formula where $0.3 \leq x \leq 0.5$, $0.2 \leq y \leq 0.4$, $0.3 \leq z \leq 0.4$, or combinations thereof. In particular instances the transition metal oxide lithium storage material includes the formula $Ni_{0.5}Co_{0.2}Mn_{0.3}$.

In any of these instances, the lithium source that combined in the mixing step may be present at greater than stoichiometric ratio.

Further disclosed are novel lithiated composite materials useful as an electrode material, optionally in a cathode for inclusion in a rechargeable lithium ion electrochemical cell. The novel lithiated composite material may be made by methods of the present invention. These materials are characterized by high capacity maintained over an unexpectedly long cycle life, particularly relative to the high nickel content lithium storage material when used alone.

The novel lithiated composite materials include: a non-lithiated high nickel content lithium storage material characterized by greater than 63 weight percent nickel; a non-lithiated transition metal oxide lithium storage material characterized by less than 55 weight percent nickel; and a lithium source; and where the resulting molecular structure of the materials is imparted by intermixing the lithium storage materials and the lithium source followed by sintering to form the final lithiated composite material. In some instances the performance characteristics of the lithiated composite materials include the ability to maintain a capacity in excess of 180 mAh/g at 40 cycles in some embodiments and, optionally a capacity in excess of 170 mAh/g at 20 cycles in other embodiments.

In particular instances, the electrode materials include the transition metal oxide lithium storage material at 20 weight percent or less, optionally 1 to 20 weight percent, relative to the high nickel content lithium storage material. Particular embodiments employ a high nickel content lithium storage material having the formula $Ni_aCo_b$ where a+b=100, where in some instances a is optionally from 80 to 100 and b is optionally from 0 to 20. In some highly specific embodiments, the high nickel content lithium storage material includes $NiO_2$, $Ni_{92}Co_8O_2$, or combinations thereof. In some instances, a high nickel content lithium storage material also includes Mn at an atomic percentage of 10% or less.

The transition metal oxide lithium storage material in particular instances has the formula $Ni_xCo_yMn_z$ where x+y+z=1. Optionally, the $Ni_xCo_yMn_z$ has the formula where 0.3≤x≤0.5, 0.2≤y≤0.4, 0.3≤z≤0.4, or combinations thereof. In particular instances the transition metal oxide lithium storage material includes the formula $Ni_{0.5}Co_{0.2}Mn_{0.3}$.

In any of these instances, the lithium source may be present at greater than stoichiometric ratio.

The methods and materials provided are significant advances in improving cycle life of high capacity electrodes useful in lithium ion electrochemical cells.

BRIEF DESCRIPTION OF THE DRAWINGS

FIGS. 2A and 2B depict an SEM image illustrating an overall surface profile of a lithiated composite material of $Ni_{92}Co_8O_2$ with $Ni_{0.5}Co_{0.2}Mn_{0.3}$ at a ratio of 80/20 (FIG. 1A) and 90/10 (FIG. 2B), respectively;

DETAILED DESCRIPTION OF EMBODIMENTS OF THE INVENTION

Figure 1A:
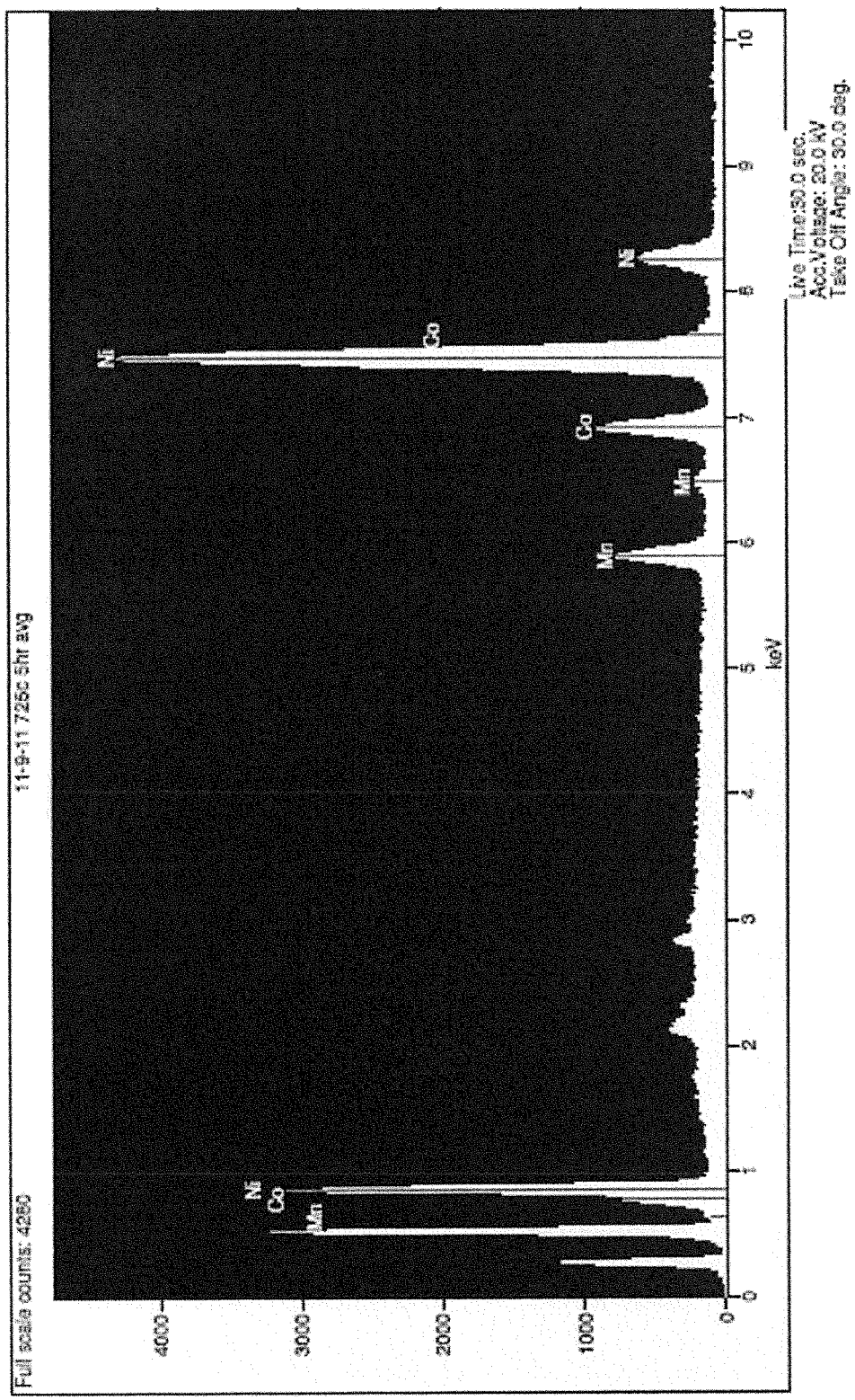
FIGS. 1A and 1B depict an ECD spectra illustrating an overall surface profile of a lithiated composite material of $Ni_{92}Co_8O_2$ with $Ni_{0.5}Co_{0.2}Mn_{0.3}$ at a ratio of 80/20 (FIG. 1A) and 90/10 (FIG. 1B), respectively.

The following description of particular embodiment(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

Scientific and technical terms used herein are intended to have the meanings commonly understood by those of ordinary skill in the art unless otherwise defined herein.

For purposes of this disclosure the terms "batteries" and "cells" will be used interchangeably when referring to one electrochemical cell, although the term "battery" can also be used to refer to a plurality of electrically interconnected cells.

The present invention is directed to composite materials and methods of their manufacture for use in a lithium ion cell. The composite materials manifest high capacity over a long cycle life. The composite materials have particular utility as a cathode material for use in a lithium ion cell. Accordingly, a high capacity, long cycle life lithiated storage material for a rechargeable lithium and electrochemical cell is provided. A lithiated storage material includes a non-lithiated high nickel content lithium storage material that is characterized by greater than 63 weight percent nickel. The high nickel content lithium storage material is intermixed with either a transition metal oxide lithium storage material that is characterized by less than 55 weight percent nickel, a dopant, or both, as well as with a lithium source. The lithium storage materials and the lithium source are intermixed and sintered so as to form a lithiated composite material. The composite material includes the high nickel content lithium storage material present as a predominate by weight relative to the transition metal oxide lithium storage material such that the composite material has not only high-capacity but is also characterized by longer cycle life than that of the high nickel content lithium storage material alone.

The inventors discovered that by adding a non-lithiated transition metal oxide lithium storage material, a non-lithiated dopant, or both at a relatively low weight percent compared to the non-lithiated high nickel content lithium storage material prior to sintering with a lithium source, that the high-capacity characteristics of the high nickel content lithium storage material could be maintained over a long cycle life. This was particularly unexpected given that prior attempts to bolster cycle life by combining such materials resulted in an unacceptable decrease in the overall capacity of the high nickel content material.

The resulting lithiated composite materials arranged as a result of particular manufacturing processes such as those described herein possess excellent capacity and greatly extended cycle life relative to the high nickel content lithium storage material alone. It is known that typical high nickel content lithium storage materials possess a high oxidation power leading to the release of oxygen, which may react with the non-aqueous electrolyte of the cell in exothermic reaction. This leads to poor cycle life with typical nickel oxide, for example, operating for 5 cycles or less before it's capacity drops below 160 mAh/g, which is a typical capacity of lower nickel content materials (e.g. less than 63 weight percent nickel). The presence of a dopant at relatively low levels compared to the high nickel content lithium storage material allows maintenance of a capacity in excess of 160 mAh/g for 20 or more cycles. Many embodiments of the invention maintain a capacity in excess of 160 mAh/g for 100 or more cycles. The inventive lithiated composite materials typically maintain a capacity in excess of 160 mAh/g for 20 cycles. More typically the materials maintain a capacity in excess of 170 mAh/g for 80 or more cycles. In some embodiments, the resulting lithiated composite material is capable of maintaining a capacity in excess of 180 mAh/gram after cycling of 40 or more cycles.

A lithiated composite material includes a high nickel content lithium storage material. High nickel content is defined herein to include 63 weight percent nickel or greater. Optionally a high nickel content lithium storage material includes 63 weight percent nickel or greater relative to other transition metals included in the material. A high nickel content lithium storage material optionally includes between 63 and 100 atomic percent nickel, or any value or range therebetween, relative to other transition metals included the material. Optionally the amount of nickel in a high nickel content lithium storage material is in excess of 64% nickel, optionally in excess of 65% nickel, optionally in excess of 70% nickel, optionally in excess of 75% nickel. In some embodiments the amount of nickel in a high nickel content lithium storage material is in excess of 80%, 85%, 90%, 95%, or 99% relative to other transition metal components of the high nickel content lithium storage material.

A high nickel content lithium storage material is optionally a nickel oxide material, optionally including the formula $Ni_aCo_b$ where a+b=100. In some embodiments, a is from 80 to 100 atomic percent. Optionally, a is 80, 81, 82, 83, 84, 85, 86, 87, 80, 89, 90, 91, 92, 93, 94, 95, 96, 97, 98, 99, or 100 and, atomic percent relative to Co. In some embodiments, a is 100. In some embodiments, a is 92. In some embodiments, b ranges from 0 to 20 atomic percent or any value or range therebetween. Optionally, b is 0. In some embodiments, b is zero, one, 2, 3, 4, 5, 6, 7, 8, 9, 10, 11, 12, 13, 14, 15, 16, 17, 18, 19, or 20 atomic percent.

The high nickel content lithium storage material when lithiated in the absence of the transition metal oxide lithium storage material additive, optionally has a capacity of 170 mAh/g or greater. Optionally, the capacity of the high nickel content lithium storage material is in excess of 170, 175, 180, 185, 190, 195, 200, 205, 210, 211, 212, 213, 214, or greater mAh/g.

In some aspects, a high nickel content lithium storage material also includes Mn. Mn when present is optionally at 10 atomic percent or less.

A composite material, in some embodiments, optionally includes a transition metal oxide lithium storage material. The transition metal oxide lithium storage material is optionally characterized by less than 55 weight percent nickel. In typical embodiments the amount of nickel present in a transition metal oxide lithium storage material is between 30 atomic percent and 50 atomic percent, or any value or range therebetween. In some embodiments, nickel is present at 30%, 35%, 40%, 45%, 50%, or 55%.

The transition metal oxide lithium storage material is optionally present at 20 weight percent or less relative to the high nickel content lithium storage material. Optionally, the transition metal oxide lithium storage material is present at from 1 to 20 weight percent relative to the high nickel content lithium storage material, or any value or range there between. Optionally, the transition metal oxide lithium storage material is present at 1, 2, 3, 4, 5, 6, 7, 8, 9, 10, 11, 12, 13, 14, 15, 16, 17, 18, 19, or 20 weight percent relative to the high nickel content lithium storage material.

The transition metal oxide lithium storage material used as an additive to the high nickel content lithium storage material optionally includes elements of the formula $Ni_xCo_yMn_z$ where x+y+z=1. In the transition metal oxide lithium storage material, x is optionally from 0 to 0.5, or any value or range therebetween. Optionally, x is from 0.3 to 0.5. Optionally, x is 0, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, or 0.50. In the transition metal oxide lithium storage material, y is optionally from 0 to 0.4, or any value or range therebetween. Optionally, y is from 0.2 to 0.4. Optionally, y is 0, 0.03, 0.1, 0.20, 0.21, 0.22, 3.23, 0.24, 0.25, 0.26, 0.27, 0.28, 0.29, 0.30, 0.31, 0.32, 0.33, 0.34, 0.35, 0.36, 0.37, 0.38, 0.39, or 0.40. In the transition metal oxide lithium storage material, z is optionally from 0 to 0.4, or any value or range therebetween. Optionally, z is from 0.3 to 0.4. Optionally, z is 0, 0.03, 0.1, 0.30, 0.31, 0.32, 0.33, 0.34, 0.35, 0.36, 0.37, 0.38, 0.39, or 0.40. Some embodiments include Ni, Co, and Mn at any value or range listed above.

It was particularly unexpected that supplementing a high nickel content lithium storage material with a relatively low level of transition metal oxide would maintain the excellent capacity of the high nickel content lithium storage material as well as provide excellent cycle life. It was believed that at relatively low levels of transition metal oxide would provide for high capacities, but would be lacking in cycle life as the characteristics of the high nickel content materials alone would predominate. This was not the case. Indeed, even at relatively very low levels of transition metal oxide lithium storage materials (e.g. 5-20%), excellent cycle life was observed along with the very high capacities. This is particularly true when $Ni_aCo_b$ is used as the predominant component.

A composite material optionally includes a dopant in place of the transition metal oxide lithium storage material or in addition thereto. A dopant is optionally an oxide or sulfide of a transition metal, where the dopant is capable of intercalating lithium. Illustrative examples of a dopant include oxides or sulfides of Ti, Mo, W, Al, Mg, Zr, Cr, V, Zn, Co, or Mn. Specific examples of a dopant include $TiO_2$, $WO_3$, $MoO_2$, $MoS_2$, $WS_2$, $Al_2O_3$, $MgO$, $ZrO2$, $V2O5$, $CrO2$, $Nb2O5$, $ZnO$, $CoO$, $MnO$ among others, or combinations thereof. Optionally, a dopant is not an oxide or sulfide of manganese. A dopant, when present, is included in the composite material at an amount of 10 weight percent or less relative to the high nickel content lithium storage material. Illustratively a dopant it is present from between 0.5 weight percent to 4 weight percent. A dopant is optionally present at 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, or 4.0 weight percent relative to the high nickel content lithium storage material.

The lithiated composite materials further include a lithium source. A lithium source is present in the lithiated composite materials at stoichiometric amounts or amounts that are moderately in excess of stoichiometric amounts. Optionally, lithium is present at an amount of 0.1% to 5% in excess of a stoichiometric amount, or any value or range therebetween. This lithium amount allows formation of a lithiated composite material whereby both the high nickel content lithium storage material and the transition metal oxide lithium storage material or dopant are sufficiently lithiated so as to be useful as a cathode material.

Also provided are methods for the formation of a high capacity, long cycle life electrode for a rechargeable lithium ion electrochemical cell that includes a lithiated composite material as described herein. Preferred methods include the mechanical intermixing of non-lithiated lithium storage materials along with a lithium source and sintering. These methods are in direct contrast to typical art practiced methods of intermixing a pre-lithiated lithium ion source with one or more dopants or other materials so as to form a composite material.

Several embodiments of a method include mechanically mixing a non-lithiated high nickel content lithium storage material with a non-lithiated transition metal material or a dopant, as well as with a lithium source where the lithium source is present at a stoichiometric amount or greater. The components are subjected to a mechanical alloying processes such as ball milling, impact milling, attritor milling, and the like, which may be utilized to at least partially alloy the particles mechanically.

The inventors unexpectedly discovered that ball milling results in a material with significantly greater capacity relative to simple hand mixing. Ball milling the materials together prior to sintering will produce between 5 to 15 mAh/g of additional capacity relative to hand mixing. As such, typical embodiments of the methods include mechanical ball milling of the materials prior to sintering.

The milled materials are then subjected to a sintering process. Typical sintering processes as known in the art are operable. Illustratively, the materials are sintered together at a temperature in excess of 700° C. and less than 950° C. In some embodiments, the materials are sintered together at a temperature of 725° C. Sintering times are typically from 1 to 10 hours. This is optionally followed by exposure to high temperatures such as that of about 1000° C. for an additional period of time to help stabilize the composite.

The processes of intermixing non-lithiated materials with the lithium source at the relative ratios and amounts of the invention creates a lithiated composite material as described herein with excellent cycle life and high capacity that is greatly superior to materials previously known in the art.

The lithiated composite materials are optionally used as a cathode active component in an electrochemical cell. A cathode is typically formed of the lithiated composite material along with any selected or preferred additives such as binders, conductive diluents, fillers, adhesion promoters, thickening agents or other additives. Such additives are known in the art and can be found described in part in U.S. Pat. No. 8,012,624. The materials may be placed in a solution or dispersion in an appropriate solvent(s) so as to form a coating mixture. The coating mixture may then be applied to an electrically conductive substrate by techniques known in the art. Common conductive substrates include copper, aluminum, stainless steel, or nickel foils.

An electrochemical cell is formed by including a cathode, an anode, an electrolyte, along with other necessary elements as known in the art to form a lithium-ion electrochemical cell. An anode is optionally formed from materials including lithium, carbonaceous materials, silicon alloys, or lithium alloys, among others.

An electrolyte is present in a lithium-ion electrochemical cell of an appropriate type, composition, concentration and form as recognized in the art. Electrolytes are optionally liquid, gel, or solid depending on the application and desired characteristics of the cell. Electrolytes optionally include a lithium salt such as $LiPF_6$, $LiBF_4$, $LiClO_4$, lithium bis (oxalato)borate, $LiN(CF_3SO_2)_2$, $LiN(C_2F_5SO_2)_2$, $LiAsF_6$, $LiC(CF_3SO_2)_3$, among many others known in the art, and combinations thereof.

The resulting lithium-ion electrochemical cells incorporating a lithiated composite material component in a cathode exhibit both high capacity and long cycle life so as to be particularly useful in many applications including portable devices and automobiles.

Various aspects of the present invention are illustrated by the following non-limiting examples. The examples are for illustrative purposes and are not a limitation on any practice of the present invention. It will be understood that variations and modifications can be made without departing from the spirit and scope of the invention.

EXPERIMENTAL

EXAMPLE 1

Lithiated composite materials of $Ni_{92}Co_8O_2$ with $Ni_{0.5}Co_{0.2}Mn_{0.3}$ (NCM 523) at ratios of 80/20 and 90/10 are prepared. For an 80/20 material, 4 grams of $Ni_{92}Co_8O_2$ is added to a mixing chamber along with 1 gram of NCM 523 and 1.4 grams of LiOH. For a 90/10 material, 4.5 grams of $Ni_{92}Co_8O_2$ is added to a mixing chamber along with 0.5 grams of NCM 523 and 1.4 grams of LiOH. The materials are mechanically mixed by ball milling for a period of 1 minute. The resulting powdered mixture is then sintered at 725° C. for 5 hours. The resulting lithiated composite material is then cooled to 25° C. and stored for further analyses.

Samples of the lithiated composite materials were analyzed by Energy Dispersive X-Ray Spectroscopy. This method is a chemical microanalysis technique in conjunction with scanning electron microscopy to characterize the elemental composition of a target material. Details of the technique can be found in *Handbook of Analytical Methods for Materials*, published by the Materials Evaluation and Engineering, Inc., Plymouth, Minn. (2006). A JOEL-JSM6320F scanning electron microscope (SEM) with energy dispersive spectroscopy (EDS) capability was used to study the phase distribution and composition.

Figure 1B:
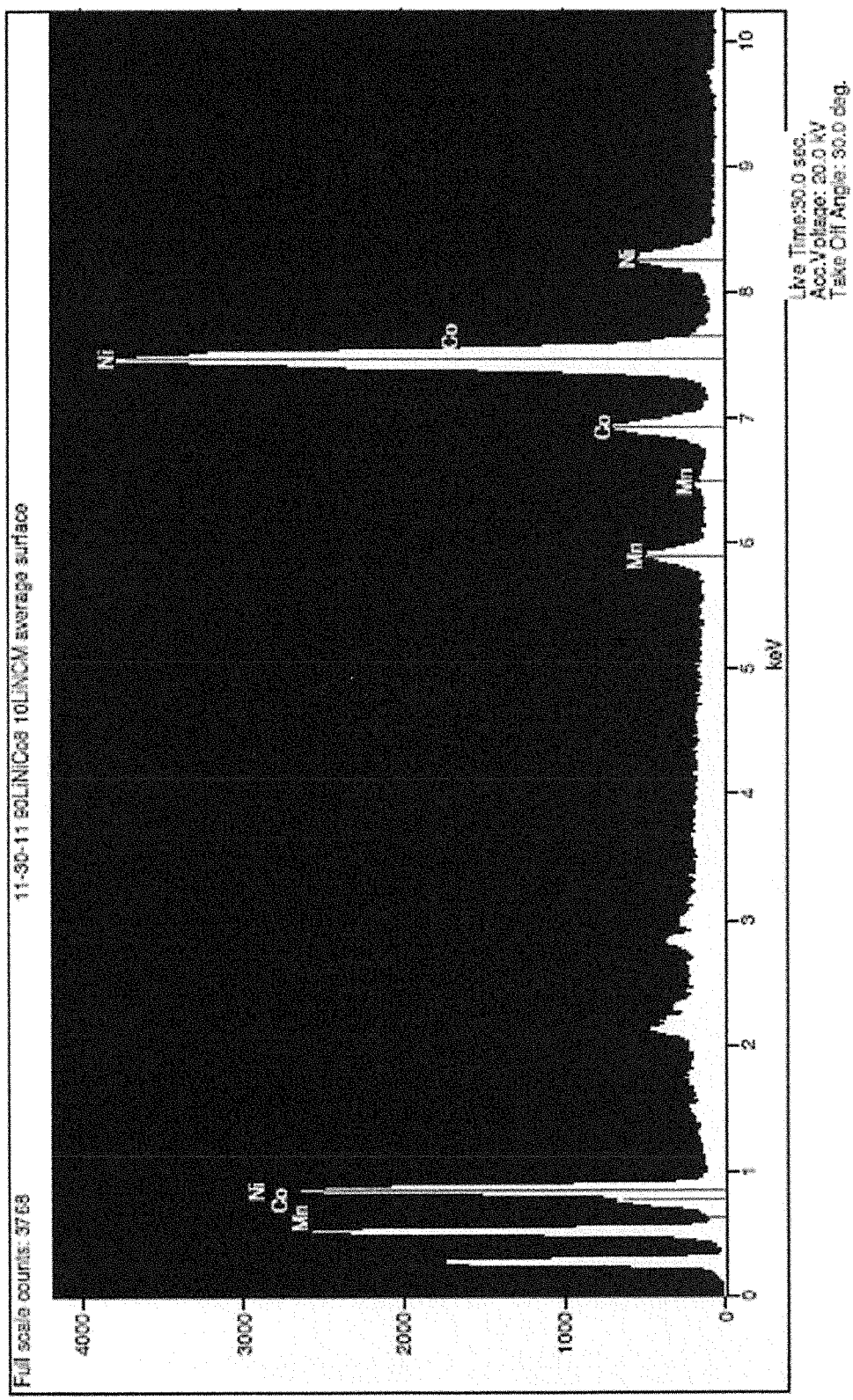

The average surface profile of each material is illustrated in FIG. 1. FIG. 1A illustrates the 80/20 material and FIG. 1B illustrates the 90/10 material. The quantitative average amounts of each element in the respective materials are illustrated in Table 1.

TABLE 1

| Material | Average Surface Atom % | | |
|---|---|---|---|
| | Mn—K | Co—K | Ni—K |
| 80/10 | 6.2 | 12.1 | 81.7 |
| 90/10 | 4 | 11.1 | 84.9 |

Sample portions of the composite materials (FIG. 2) are further analyzed. Detailed analyses of the materials revealed that the lithiated composite material is present in two distinct phases. The atomic percentages of each element in examples of each of the two phases is found in Tables 2 and 3.

TABLE 2

Atomic composition of 80/20 material.

| Spot Number | Atom % | | |
|---|---|---|---|
| | Mn—K | Co—K | Ni—K |
| 1 | 24.9 | 20.9 | 54.2 |
| 2 | 27.3 | 20.9 | 51.8 |
| 3 | 22.5 | 19.3 | 58.2 |
| 4 | 27.2 | 19.7 | 53.1 |
| 5 | 26.7 | 20.5 | 52.9 |
| 6 | 1 | 9.5 | 89.5 |
| 7 | 1.2 | 10 | 88.8 |
| 8 | 2.8 | 11.9 | 85.4 |
| 9 | 2 | 10.7 | 87.2 |
| 10 | 1.5 | 10.4 | 88.1 |

TABLE 3

Atomic composition of 90/10 material.

| Spot Number | Atom % | | |
|---|---|---|---|
| | Mn—K | Co—K | Ni—K |
| 1 | 0.4 | 9 | 90.6 |
| 2 | 0.3 | 9.3 | 90.4 |
| 3 | 0.7 | 9.4 | 89.8 |
| 4 | 1.6 | 12.5 | 85.9 |
| 5 | 0.9 | 10.7 | 88.5 |
| 6 | 0.5 | 9.2 | 90.3 |
| 7 | 0.6 | 10.1 | 89.4 |
| 8 | 24.7 | 20.1 | 55.2 |
| 9 | 1.5 | 11.4 | 87.1 |

The ECS analyses of the 80/20 material demonstrate that the Mn from the NCM material migrated to the high nickel content material phase by about 1%-3%. Less Mn migrated in the 90/10 material showing 0.5% to 1.5% migration. In addition, a small amount of Ni from the high nickel content phase migrated to the NCM phase (0.5%-1%). It is believed that this compositional change provides the increased stability of the composite with respect to the high nickel content material as demonstrated by increased cycle life.

The lithiated composite materials are studied for capacity levels and cycle life in CR2032 coin cells using lithium metal as counter electrode. The lithiated composite materials are formed into a cathode powder for testing by mixing with carbon Super 65 from Timcal (7.5 w %), graphite KS10 from Timcal (7.5%) and 6% PVDF (Kynar) binder. Anhydrous solvent (1-methyl-2pyrrolidinone) was then added to the powder mix to form a slurry. The slurry was then coated on an aluminum substrate. The coating was dried at 85° C. for several hours and calendared to the final thickness (~60 μm).

The cathode and anode materials are separated by a microporous polypropylene separator (MTI corporation) that was wetted with electrolyte consisting of a 1M solution of $LiPF_6$ dissolved in a 1:1:1 volume mixture of ethylene carbonate (EC), Dimethyl Carbonate (DMC), and diethyl carbonate (DEC) from Novolyte Corporation. The cell was crimped and used to probe the capacity and cycle life of the lithiated composite material. Cell assembly and crimping was done in glove box.

Figure 3:
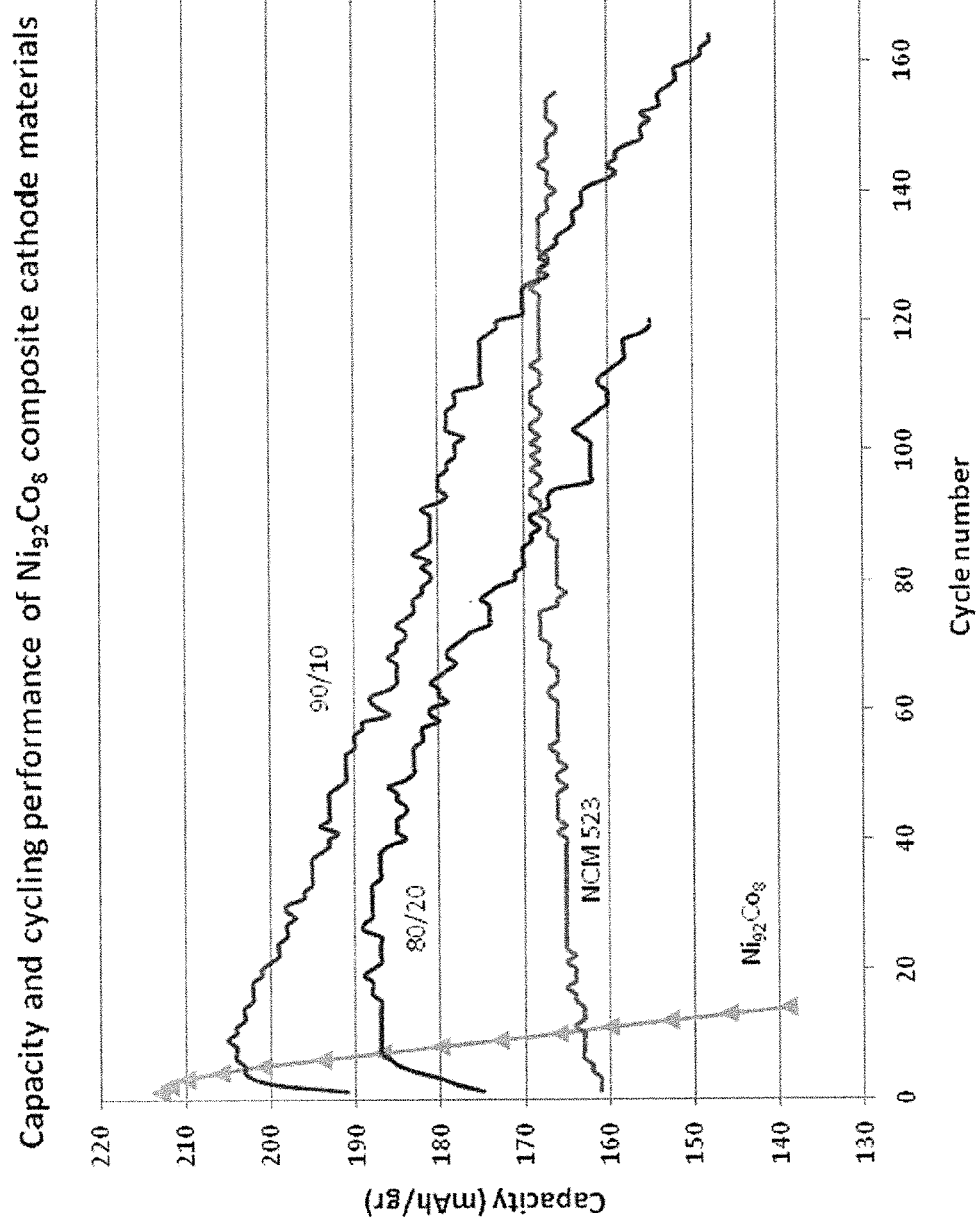
FIG. 3 illustrates the cycleability and capacities of a lithiated composite material of $Ni_{92}Co_8O_2$ with $Ni_{0.5}Co_{0.2}Mn_{0.3}$ at a ratio of 80/20 and 90/10.

Tests of the cathode materials were run at constant current charge and discharge (0.1C) to determine capacity and cycleability using Solatron 1470 Battery Test Unit and Arbin Instruments battery testerpower system. The coin cells were charged and discharged at a voltage between 4.3V and 3.0V. The cycling performance test was performed with a charge and discharge current each at 18 mA/g. As is depicted in FIG. 3, both the 80/20 and the 90/10 cathodes exhibited peak capacity well in excess of 180 mAh/g with the 90/10 composite material demonstrating peak capacity well in excess of 200 mAh/g. Unexpectedly, the 90/10 composite material demonstrated higher capacity for much longer cycle life with an excess of 170 mAh/g capacity present well beyond 80 cycles. The 80/20 composite material demonstrated acceptable capacity in excess of 170 mAh/g at about 80 cycles.

This result was surprising as it was believed that the lower level of NCM 523 material as tested here would exhibit significantly reduced cycle life similar to the $Ni_{92}Co_8O_2$ material alone as this material predominant to such a great extent. In contrast to this belief, excellent cycle life was maintained even in the 90/10 material.

EXAMPLE 2

Lithiated composite materials of $NiO_2$ with $Ni_{0.5}Co_{0.2}Mn_{0.3}$ (NCM 523) at ratios of 80/20 and 90/10 are prepared substantially as described in Example 1. For an 80/20 material, 4 grams of $NiO_2$ is added to a mixing chamber along with 1 gram of NCM 523 and 1.4 grams of LiOH. For a 90/10 material, 4.5 grams of $NiO_2$ is added to a mixing chamber along with 0.5 grams of NCM 523 and 1.4 grams of LiOH. The materials are mechanically mixed by ball milling for a period of 1 minute. The resulting powdered mixture is then sintered at 725° C. for 5 hours. The resulting lithiated composite material is then cooled to 25° C. and stored for further analyses.

The lithiated composite material of $NiO_2$ and NCM 523 is studied for capacity levels and cycle life as a cathode material used to for, coin cells substantially as described in Example 1.

Figure 4:
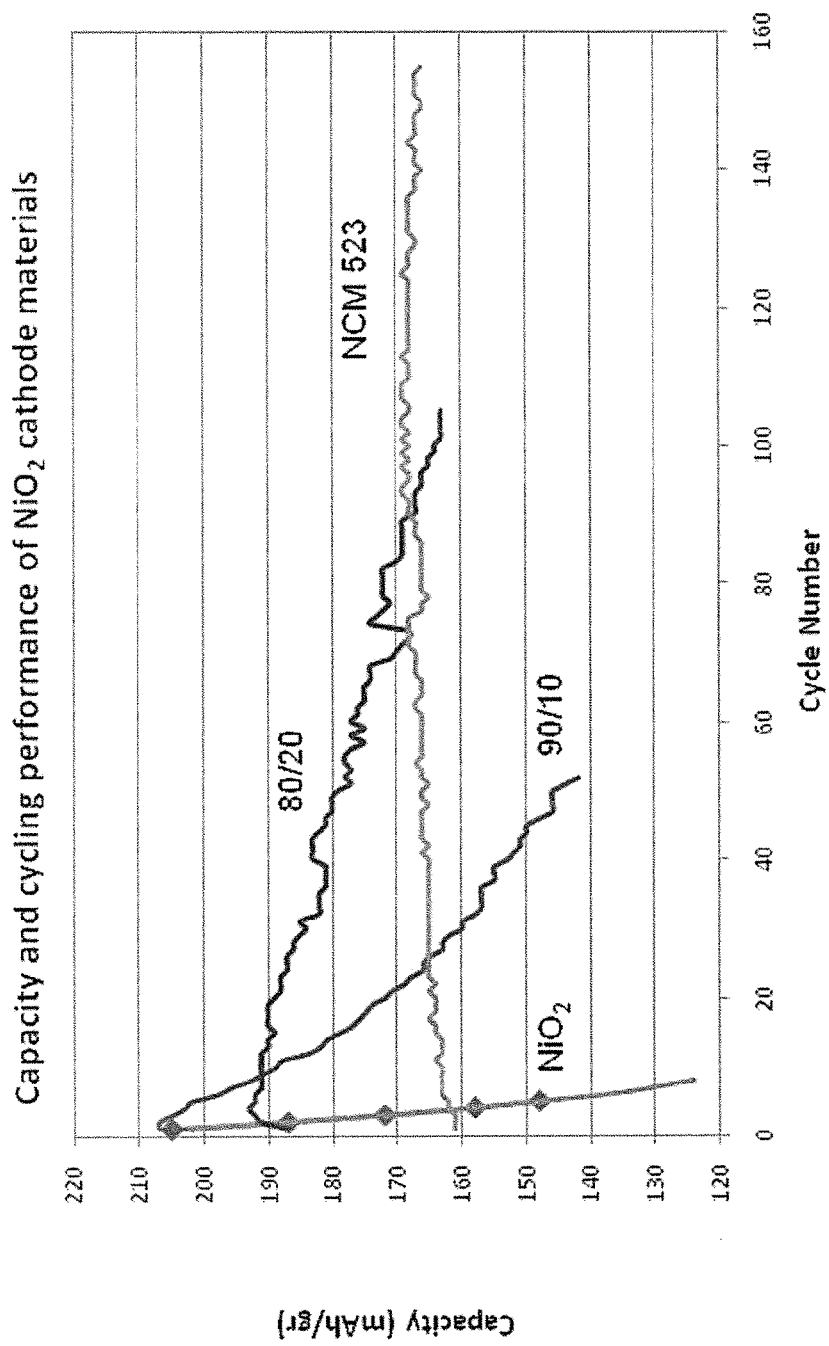
FIG. 4 illustrates the cycleability and capacities of a lithiated composite material of $NiO_2$ with $Ni_{0.5}Co_{0.2}Mn_{0.3}$ at a ratio of 80/20 and 90/10.

The coin cells were charged and discharged at a voltage between 4.3V and 3.0V. The cycling performance test was performed with a charge and discharge current each at 18 mA/g. As is depicted in FIG. 4, both the 80/20 and the 90/10 cathodes exhibited peak capacity well in excess of 190 mAh/g with the 90/10 composite material demonstrating peak capacity virtually identical to the $NiO_2$ material alone. Interestingly, the 80/20 composite material demonstrated higher capacity for much greater cycling than the 90/10 material with an excess of 170 mAh/g capacity present well beyond 80 cycles. The 90/10 composite material was capable of capacity in excess of 170 mAh/g for greater than 20 cycles representing a significant improvement relative to the $NiO_2$ alone.

EXAMPLE 3

Mixing Technique Affects Composite Performance

The lithiated composite materials of Examples 1 and 2 were formed as in Examples 1 or 2, with the exception that mixing was done using conventional hand mixing by mortar and pestle prior to sintering. The hand mixed materials were then compared to the material formed as in Examples 1 and 2 using ball mill mixing for capacity levels and cycle life using coin cells formed and tested substantially as described in Example 1.

Figure 5B:
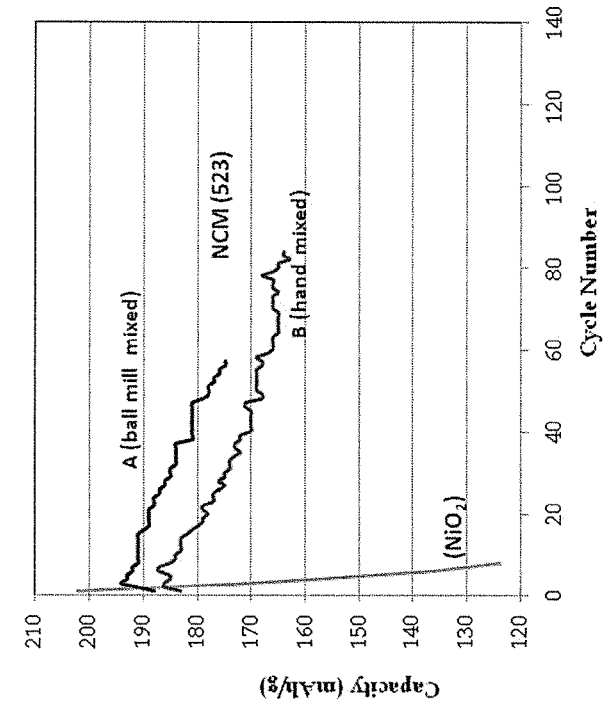
FIGS. 5A and 5B illustrate the effect of different mixing methods on the cycleability and capacities of a lithiated composite material of $Ni_{92}Co_8O_2$ with $Ni_{0.5}Co_{0.2}Mn_{0.3}$ at a ratio of 80/20 (FIG. 5A) and $NiO_2$ with $Ni_{0.5}Co_{0.2}Mn_{0.3}$ at a ratio of 80/20 (FIG. 5B)
Figure 5A:
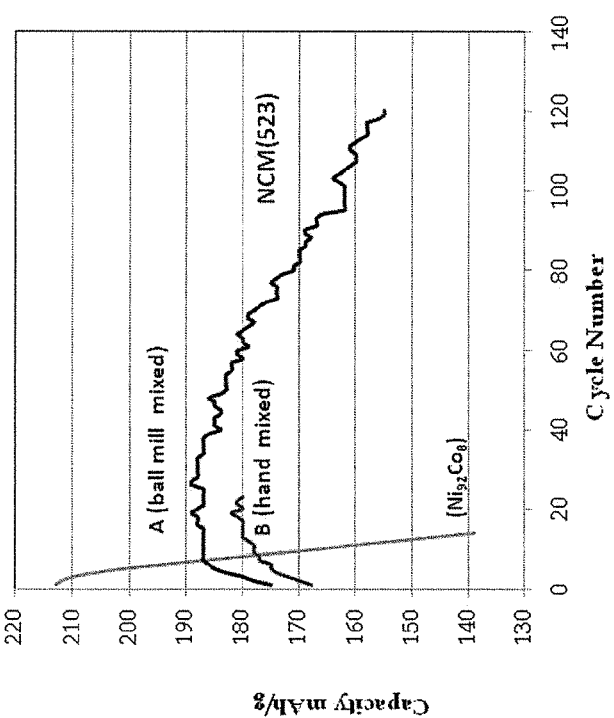

The results of different mixing processes of the predominantly $Ni_{92}Co_8O_2$ material are illustrated in FIG. 5A. The results of different mixing processes of the predominantly $NiO_2$ material are illustrated in FIG. 5B. For both the composite material types, ball mill mixing produced much greater capacity that was maintained for many additional cycles. Ball mill mixing of the $Ni_{92}Co_8O_2$ material provided nearly 10 mAh/g improved capacity that was maintained above 170 mAh/g for nearly 80 cycles. Ball milling of the $NiO_2$ material showed similar results.

These results suggest that mixing method is an important parameter in the formation of optimal lithiated composite materials. Ball mill mixing prior to sintering consistently resulted in increased capacity and cycle life.

EXAMPLE 4

Lithiated composite materials of $Ni_{92}Co_8O_2$ with a dopant at various relative amounts between 1 atomic % and 5 atomic % are prepared. Several dopant materials are investigated including $TiO_2$ (3.5%), $WO_3$ (1%), $MoO_2$ (0.5%) at a dopant amount relative to the $Ni_{92}Co_8O_2$ as indicated. 5 grams of $Ni_{92}Co_8O_2$ is added to a mixing chamber along with the appropriate amount of dopant and 1.4 grams of LiOH. The materials are milled by pestle until thoroughly intermixed. The resulting powdered mixture is then sintered at 725° C. for 5 hours.

Figure 6:
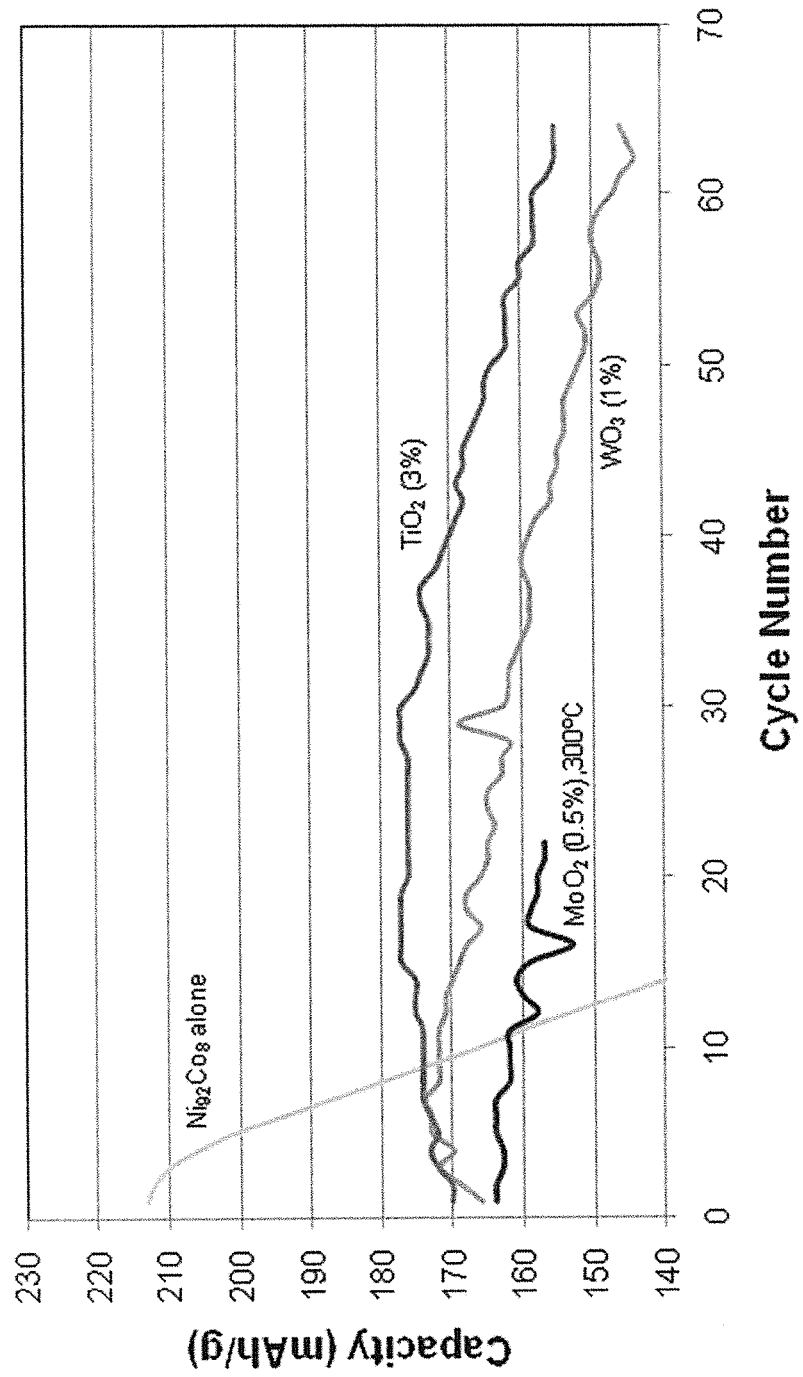
FIG. 6 illustrates the cycleability and capacities of a lithiated composite material of $Ni_{92}Co_8O_2$ doped with different oxides including $TiO_2$ (3%), $WO_3$ (1%), and $MoO_2$ (0.5%)

The lithiated composite materials are used to form electrodes and tested in coin cells substantially as described in Example 1. As is demonstrated in FIG. 6, the presence of each dopant material reduces the peak capacity of the material relative to the predominant component ($Ni_{92}Co_8O_2$). The cycle life is significantly improved, however, as reflected by the slope of the capacity vs. cycle number. The presence of 3% $TiO_2$ demonstrated a capacity of 170 mAh/g attained out to nearly 40 cycles. The 1% $WO_3$ dopant including composite material was capable of maintaining a capacity in excess of 160 mAh/g in excess of 30 cycles. Both materials are significantly better than the predominant $Ni_{92}Co_8O_2$ material alone. The inclusion of 0.5% $MoO_2$ resulted in the lowest maximum capacity and dropped below 160 mAh/g by 12 cycles. Overall, $TiO_2$ and $WO_3$ at levels less than 5% produce excellent cycle life to the predominant $Ni_{92}Co_8O_2$ material.

EXAMPLE 5

Lithiated composite materials of $NiO_2$ with a dopant at various relative amounts between 1 atomic % and 5 atomic % are prepared. Preparation procedures are substantially as described in Example 1. Several dopant materials are investigated including $TiO_2$ (3.5%), $WO_3$ (1%), $MoO_2$ (0.5%) at a dopant amount relative to the $NiO_2$ as indicated. Approximately 5 grams of $NiO_2$ is added to a mixing chamber along with the appropriate amount of dopant and 1.4 grams of LiOH. The materials are milled by pestle until thoroughly intermixed. The resulting powdered mixture is then sintered at 725° C. for 5 hours.

Figure 7:
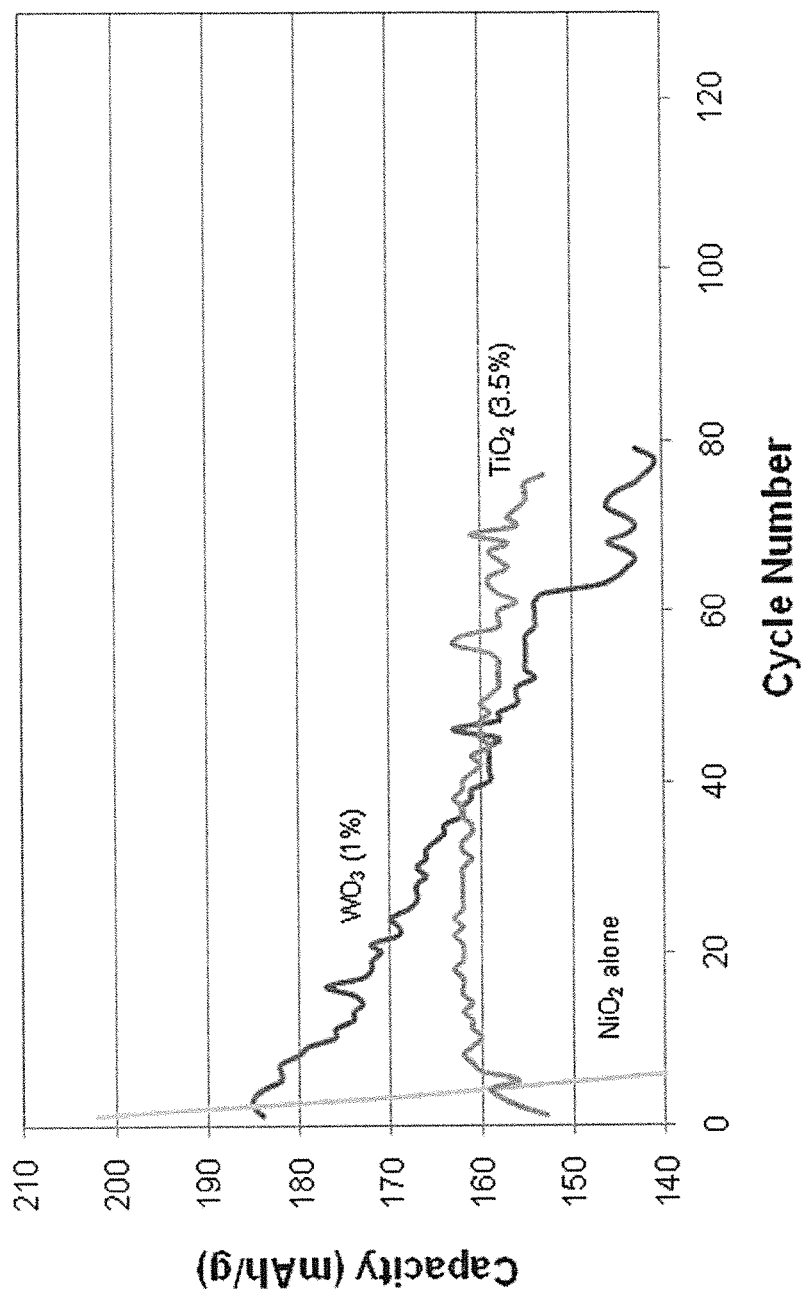
FIG. 7 illustrates the cycleability and capacities of a lithiated composite material of $NiO_2$ doped with different oxides including $TiO_2$ (3%) and $WO_3$ (1%).

The lithiated composite materials are used to form electrodes and tested in coin cells substantially as described in Example 1. As is demonstrated in FIG. 7, the presence of each dopant material reduces the peak capacity relative to the predominant component ($NiO_2$) alone. The cycle life is significantly improved, however, with the presence of 3.5% $TiO_2$ providing capacity of 160 mAh/g out to over 40 cycles. The 1% $WO_3$ dopant including composite material showed much greater peak capacity and was capable of maintaining a capacity in excess of 160 mAh/g in excess of 40 cycles. Both materials possess significantly greater cycle life than the predominant $NiO_2$ material alone, as well as possessing excellent capacities over this cycle life.

Various modifications of the present invention, in addition to those shown and described herein, will be apparent to those skilled in the art of the above description. Such modifications are also intended to fall within the scope of the appended claims.

It is appreciated that all reagents are obtainable by sources known in the art unless otherwise specified.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A method of making an electrode material for a rechargeable lithium ion electrochemical cell, said method comprising the steps of:
    (a) providing a non-lithiated high nickel content lithium storage material comprising $Ni_aCo_b$ where a is from 81 to 99 and b is from 1 to 19, where a and b are relative atomic amounts of Ni and Co respectively, and a+b=100;
    (b) providing a non-lithiated transition metal oxide lithium storage material comprising the formula $Ni_xCo_yMn_z$ where $0.3 \leq x \leq 0.5$, $0.2 \leq y \leq 0.4$, $0.3 \leq z \leq 0.4$, or combinations thereof, where x, y, and z are relative atomic amounts of Ni Co and Mn respectively, and where x+y+z=1;
    (c) mixing by ball milling said non-lithiated high nickel content lithium storage material and said non-lithiated transition metal oxide lithium storage material with a lithium source to form a lithiated composite material, wherein said high nickel content lithium storage material is present as a predominant by weight relative to said transition metal oxide lithium storage material; and
    (d) sintering said lithiated composite material, wherein said composite material is characterized by a longer cycle life than that of lithiated high nickel content lithium storage material.

2. The method of claim 1 wherein said composite material following sintering maintains a capacity in excess of 180 milliamphours per gram at 40 cycles.

3. The method of claim 1 wherein said composite material following sintering maintains a capacity in excess of 170 milliamphours per gram at 20 cycles.

4. The method of claim 1 wherein said transition metal oxide lithium storage material is present at from 1 to 20 weight percent relative to said high nickel content lithium storage material.

5. The method of claim 1 wherein said lithium source is present at greater than stoichiometric ratio.

6. An electrode material for a rechargeable lithium ion electrochemical cell, said electrode material comprising:

a non-lithiated high nickel content lithium storage material comprising $Ni_aCo_b$ where a is 63 or greater and a+b=100;

a non-lithiated transition metal oxide lithium storage material comprising the formula $Ni_xCo_yMn_z$ wherein $0.3 \leq x \leq 0.5$, $0.2 \leq y \leq 0.4$, $0.3 \leq z \leq 0.4$, or combinations thereof and where x+y+z=1; and a lithium source;

said non-lithiated high nickel content lithium storage material and said non-lithiated transition metal oxide lithium storage material and said lithium source intermixed by ball milling and sintered to form a lithiated composite material;

wherein said high nickel content lithium storage material is present as a predominant by weight relative to said transition metal oxide lithium storage material; and wherein said composite material is characterized by a longer cycle life than that of lithiated high nickel content lithium storage material.

7. The electrode material of claim 6 wherein said transition metal oxide lithium storage material is present at from 1 to 20 weight percent relative to said high nickel content lithium storage material.

8. The electrode material of claim 6 wherein said composite material maintains a capacity in excess of 180 milliamphours per gram at 40 cycles.

9. The electrode material of claim 6 wherein said composite material maintains a capacity in excess of 170 milliamphours per gram at 20 cycles.

10. The electrode material of claim 6 wherein a is from 80 to 100 and b is from 0 to 20.

11. The electrode material of claim 6 wherein said high nickel content lithium storage material comprises $Ni_{92}Co_8$, or combinations thereof.

12. The electrode material of claim 6 wherein said high nickel content lithium storage material further comprises Mn at an atomic percentage of 10% or less.

13. The electrode material of claim 6 wherein said transition metal oxide lithium storage material comprises the formula $Ni_{0.5}Co_{0.2}Mn_{0.3}$.

14. The electrode material of claim 6 wherein said lithium source is present at greater than stoichiometric ratio.

* * * * *